No. 790,201. PATENTED MAY 16, 1905.
E. J. FULLER.
METALLIC PACKING.
APPLICATION FILED MAR. 13, 1905.
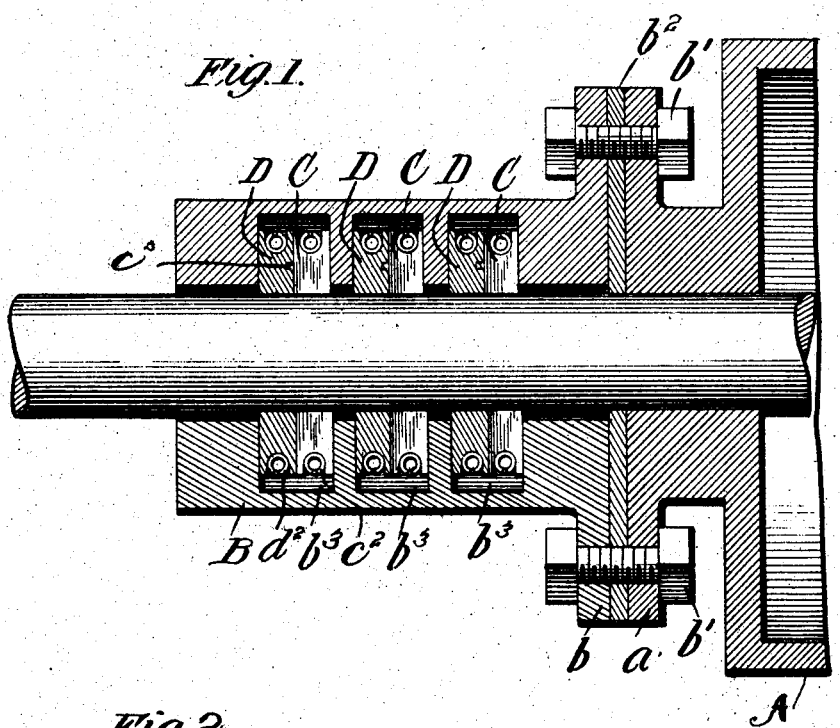
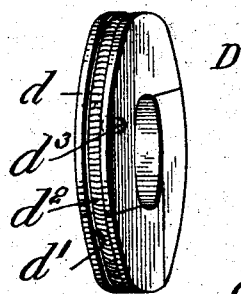
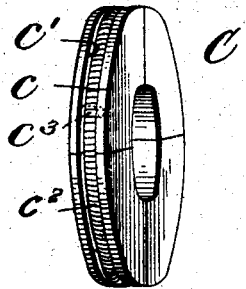
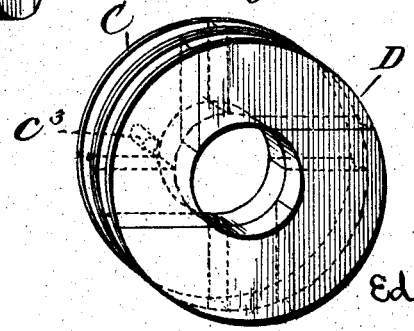
WITNESSES:
INVENTOR
Edward J. Fuller,
BY
Bluford C. Brockett
Attorney No. 790,201.  
Patented May 16, 1905.

UNITED STATES PATENT OFFICE.

EDWARD J. FULLER, OF ELYRIA, OHIO.

METALLIC PACKING.

SPECIFICATION forming part of Letters Patent No. 790,201, dated May 16, 1905.

Application filed March 13, 1905. Serial No. 249,809.

*To all whom it may concern:*

Be it known that I, EDWARD J. FULLER, a citizen of the United States, residing at Elyria, in the county of Lorain and State of Ohio, have invented new and useful Improvements in Metallic Packing, of which the following is a specification.

My invention relates to metallic packing for piston-rods and the like, and contemplates the use of a cage of any preferred form and construction secured to the head of the cylinder and provided with suitable grooves for the reception of the packing-rings which form the subject-matter of this application.

The packing-rings employed are arranged in pairs in the grooves of the cage and are both cut into several parts, preferably four, although a greater number of cuts may be used with even greater efficiency. These several parts are held together by means of a coiled spring arranged in a groove in the pieces. The rings are not alike, however, as the one nearest to the cylinder is provided with radial cuts, while the other is provided with tangential cuts, extending from the outer to the inner periphery thereof. This is of great importance, for the arrangement of the two kinds of cut rings makes a complete joint between the rod and the cage.

The invention also consists in the construction and combination of parts hereinafter described in the following specification, drawings, and claims.

Referring to the drawings, Figure 1 is a horizontal sectional view of a portion of a cylinder provided with my improved packing. Fig. 2 is a perspective view of the tangentially-cut ring. Fig. 3 is a perspective view of the radially-cut ring, and Fig. 4 is a perspective view of a pair of the rings.

In carrying out my invention any preferred form of cage may be employed so long as it has suitable grooves for the reception of the packing-rings; but I have shown one form in the drawings which meets the required conditions very effectively, and in such embodiment A represents a cylinder provided with the usual flange $a$, to which is secured the cage B, containing the packing-rings C and D. This cage B is firmly held in place against the flange $a$ by means of bolts $b'$ $b'$. A sheet of packing $b^2$ is arranged between the cage and the cylinder-head for the purpose of preventing any leakage at that point.

The cage B is further provided with suitable grooves $b^3$ for the pairs of packing-rings C and D. Three of these grooves are shown in the drawings, although a greater number may be used without departing from the spirit of the invention. The ring C of each pair is cut radially into four parts $c$, and each of these parts has a groove $c'$ for the coiled spring $c^2$, which holds them all together around the piston-rod A'. One of the parts $c$ is provided with a pin $c^3$, extending from the face thereof for a purpose which will later appear. This ring receives the force of the pressure of the motor fluid in the cylinder.

The ring D, as shown in Fig. 2, is cut tangentially into four parts, and these several parts $d$ are each provided with a groove $d'$ for receiving the coiled spring $d^2$, which holds the parts together. The cuts of this ring extend tangentially from the outer to the inner periphery thereof, whereby the ring will have unlimited opportunity for contraction around the rod. One of these parts is provided with an opening $d^3$ for the pin $c^3$ to fit into, whereby the cuts of the two rings are held out of alinement.

The effect of the arrangement of the rings in pairs, consisting of one radially-cut ring and another tangentially cut, is such that when the rod passes through the rings the parts of the radially-cut ring will move in radial lines away from the rod to accommodate themselves to the unevenness thereof, while the tangentially-cut ring will permit only to its parts a movement in the lines parallel to the tangent cuts. In this way one ring will assist the other and the several parts will fit tightly about the rod and all leakage will be prevented.

Having described my invention, I claim—

1. In a metallic packing, the combination with the cage, of a pair of rings within said cage, one having radial cuts and the other having tangential cuts extending from the inner periphery to the outer periphery thereof, the cuts of one ring being out of alinement with the cuts of the other.

2. In a metallic packing, the combination with the cage, of a pair of rings within said cage one of said rings having four radial cuts and the other having four tangential cuts extending from the inner to the outer periphery thereof, means for holding the parts of both rings together, and means for retaining the cuts of one ring out of alinement with the cuts of the other.

3. In a metallic packing, the combination with the cage, and cylinder-head to which it is applied, of a pair of rings within said cage one of said rings having radial cuts and being placed nearer the cylinder-head than the other said other ring having tangential cuts extending from the inner to the outer periphery thereof and being placed between the first-mentioned ring and the cage, means for holding the parts of the two rings together, and means for retaining the cuts of one ring out of alinement with the cuts of the other.

4. In combination, a cylinder-head and piston-rod, a packing-cage secured to said cylinder said cage having suitable grooves for the reception of the packing-rings, a pair of rings in each of said grooves, one of the rings in each pair being radially cut into four parts and being placed nearer to the cylinder than the other, the other ring being tangentially cut into four parts and being placed between the first ring and the cage the cuts of said last-mentioned ring extending from the inner to the outer periphery thereof, means for holding the several parts of both rings together around the rod, and means for retaining the cuts of one ring out of alinement with the cuts of the other.

In testimony whereof I have signed my name to this specification in the presence of two subscribing witnesses.

EDWARD J. FULLER.

Witnesses:
 NELLIE FLANNERY,
 FRED F. THOMAS.